US010110395B2

(12) United States Patent
Wu et al.

(10) Patent No.: US 10,110,395 B2
(45) Date of Patent: Oct. 23, 2018

(54) CONTROL METHOD AND CONTROL DEVICE FOR SMART HOME DEVICE

(71) Applicant: Xiaomi Inc., Beijing (CN)

(72) Inventors: Ke Wu, Beijing (CN); Xinyu Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 250 days.

(21) Appl. No.: 15/135,628

(22) Filed: Apr. 22, 2016

(65) Prior Publication Data
US 2016/0315784 A1 Oct. 27, 2016

(30) Foreign Application Priority Data

Apr. 27, 2015 (CN) .......................... 2015 1 0204825

(51) Int. Cl.
G06F 9/48 (2006.01)
H04L 29/08 (2006.01)
H04L 12/28 (2006.01)
G05B 15/02 (2006.01)

(52) U.S. Cl.
CPC .......... *H04L 12/2818* (2013.01); *G05B 15/02* (2013.01); *G06F 9/4881* (2013.01); *H04L 12/2816* (2013.01); *H04L 67/18* (2013.01)

(58) Field of Classification Search
CPC . H04L 12/2818; H04L 67/18; H04L 12/2816; G05B 15/02; G06F 9/4881
See application file for complete search history.

(56) References Cited

U.S. PATENT DOCUMENTS 7,783,423 B2 * 8/2010 Verma ................ G08B 13/1436
340/989
7,942,844 B2 * 5/2011 Moberg ................ A61M 5/142
604/65
(Continued)

FOREIGN PATENT DOCUMENTS

CN 202198415 U 4/2012
CN 103268085 A 8/2013
(Continued)

OTHER PUBLICATIONS

International Search Report dated Mar. 15, 2016 in PCT/CN2015/098708 (with English Translation).
(Continued)

*Primary Examiner* — Ramesh Patel
(74) *Attorney, Agent, or Firm* — Oblon, McClelland, Maier & Neustadt, L.L.P.

(57) ABSTRACT

The present disclosure relates to a control method and a control device for an electronic device, such as a smart home device. The method includes acquiring, by a control device, personal information of participating persons to be served by the electronic device, and determining an operation mode of the electronic device based on the personal information, for the electronic device to perform a task for serving the participating persons according to the operation mode. In the present disclosure, in an example, the smart home device can perform a task according to various operation modes based on personal information of participating persons, and thus can achieve intelligent operation, meet the user's demands and improve the user experience.

20 Claims, 7 Drawing Sheets

(56) References Cited

U.S. PATENT DOCUMENTS

| | | | |
|---|---|---|---|
| 8,090,462 B2* | 1/2012 | Wininger | G06Q 10/06 |
| | | | 700/100 |
| 8,115,609 B2* | 2/2012 | Ketari | G08B 13/1427 |
| | | | 340/426.16 |
| 8,594,850 B1* | 11/2013 | Gourlay | G05B 15/02 |
| | | | 700/276 |
| 9,176,651 B2* | 11/2015 | Schubert | G06F 9/4445 |
| 9,815,191 B2* | 11/2017 | Oleynik | B25J 9/0081 |
| 2007/0255250 A1* | 11/2007 | Moberg | A61M 5/142 |
| | | | 604/503 |
| 2009/0164490 A1* | 6/2009 | Wininger | G06Q 10/06 |
| 2011/0169654 A1* | 7/2011 | Ketari | G08B 13/1427 |
| | | | 340/687 |
| 2012/0257621 A1 | 10/2012 | Ishii et al. | |
| 2013/0331087 A1 | 12/2013 | Shoemaker et al. | |
| 2014/0045482 A1 | 2/2014 | Bisson et al. | |
| 2015/0094860 A1 | 4/2015 | Finnerty et al. | |
| 2015/0290795 A1* | 10/2015 | Oleynik | G05B 19/42 |
| | | | 700/257 |

FOREIGN PATENT DOCUMENTS

| | | |
|---|---|---|
| CN | 103838160 A | 6/2014 |
| CN | 104146586 A | 11/2014 |
| CN | 104460328 A | 3/2015 |
| CN | 104482656 A | 4/2015 |
| CN | 104898613 A | 9/2015 |
| EA | 200901202 A1 | 4/2010 |
| JP | 2003-219485 A | 7/2003 |
| JP | 2004-126653 A | 4/2004 |
| JP | 2007-49517 A | 2/2007 |
| JP | 2012-222580 A | 11/2012 |
| KR | 10-2010-0045841 A | 5/2010 |
| KR | 10-2014-0133337 A | 11/2014 |
| RU | 108611 U1 | 9/2011 |
| WO | WO 2004/098127 A1 | 11/2004 |
| WO | WO 2016/173282 A1 | 11/2016 |

OTHER PUBLICATIONS

Extended European Search Report dated Aug. 24, 2016 in Patent Application No. 16166256.4.

Office Action dated Feb. 28, 2017 in Chinese Patent Application No. 201510204825.X.

Office Action dated May 30, 2017 in Japanese Patent Application No. 2017-514784.

Office Action dated Apr. 3, 2017 in Korean Patent Application No. 10-2016-7004766.

Japanese Office Action dated Nov. 21, 2017 in Patent Application No. 2017-514784.

Combine Russian Federation Office Action and Search Report dated Jul. 31, 2017 in Patent Application No. 2016113840/08(021712) (with English translation and with English translation of categories of cited documents).

* cited by examiner

CONTROL METHOD AND CONTROL DEVICE FOR SMART HOME DEVICE

CROSS-REFERENCE TO RELATED APPLICATIONS

The present application is based upon and claims priority to Chinese Patent Application No. 201510204825.X filed Apr. 27, 2015, the entire contents of which are incorporated herein by reference.

TECHNICAL FIELD

The present disclosure generally relates to the field of communication technology, and more particularly, to a control method and a control device for a smart home device.

BACKGROUND

With development and popularity of internet technology, smart home devices have stepped into people's daily lives gradually. Smart home devices refer to various kinds of home devices that can access the internet, such as smart lamps, smart rice cookers, and the like. Taking a smart rice cooker for example, the smart rice cooker can cook rice in various manners based on user settings. However, different dining persons have different tastes in meal, and some favor hard rice, some favor soft rice. In the related art, a smart rice cooker is not smart enough to cook based on person's preferences.

SUMMARY

Aspects of the disclosure provide a method for controlling an electronic device. The method includes acquiring, by a control device, personal information of participating persons to be served by the electronic device, and determining an operation mode of the electronic device based on the personal information, for the electronic device to perform a task for serving the participating persons according to the operation mode.

According to an aspect of the disclosure, the personal information contains: identity information and preference information. Then, the method includes acquiring, via a router, a list of devices connected into a network, determining the identity information of the participating persons based on the list and acquiring the preference information of the participating persons based on the identity information of the participating persons. Further, in an example, the method includes acquiring locations of devices that belong to persons who join a service program, determining the identity information of the participating persons based on the locations of the devices, and acquiring the preference information of the participating persons based on the identity information.

In an example, to acquire the personal information of participating persons to be served by the electronic device, the method includes analyzing one or more of log files, chat transcripts and emails to acquire the personal information of the participating persons.

In an example, when the control device is separate from the electronic device, the method includes sending the operation mode to the electronic device for causing the electronic device to perform the task according to the operation mode; and when the control device is the electronic device, the method includes performing the task according to the operation mode.

Further according to an aspect of the disclosure, the method includes determining material information for the electronic device to serve the participating persons based on the personal information. When the control device is the electronic device, the method includes processing material based on the material information and performing the task according to the operation mode; and when the control device is separate from the electronic device, the method includes sending the material information to the electronic device for the electronic device to process material based on the material information and to perform the task according to the operation mode.

In an example, the method further includes determining a target finishing time of the task and calculating a starting time based on the target finishing time of the task. When the control device is the electronic device, the method includes: starting performing the task at the starting time and when the control device is a separate from the electronic device, the method includes sending a message including the starting time to the electronic device for the electronic device to start performing the task at the starting time.

To determine the target finishing time of the task, in an example, the method includes determining the target finishing time of the task based on locations of the participating persons. In another example, the method includes determining the target finishing time of the task based on locations and preference information of the participating persons.

Aspects of the disclosure provide a control device for controlling an electronic device. The control device includes a processor and a memory for storing instructions executable by the processor. The processor is configured to perform acquire personal information of participating persons to be served by the electronic device and determine an operation mode of the electronic device based on the personal information, for the electronic device to perform a task for serving the participating persons according to the operation mode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
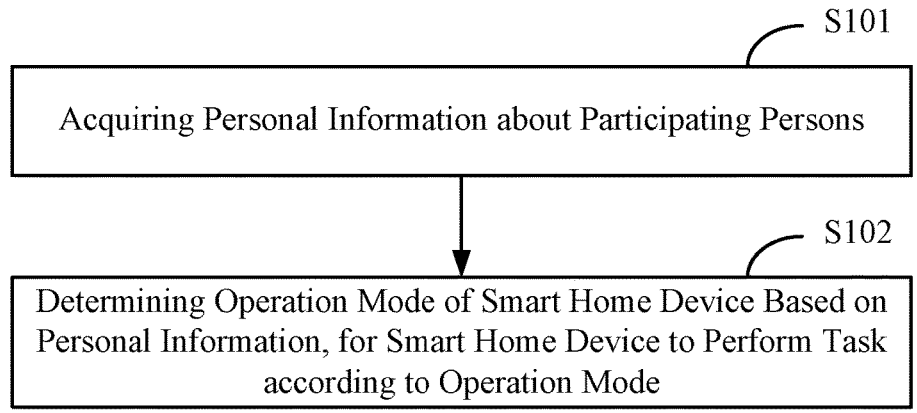
FIG. 1 is a flow chart illustrating a control method for a smart home device according to an exemplary embodiment.

FIG. 1 is a flow chart illustrating a control method for a smart home device according to an exemplary embodiment.

As shown in FIG. 1, the control method for a smart home device can be applied in a smart device such as a smart home device, a smart terminal or the like, and includes the following steps.

In step S101, personal information about participating persons is acquired.

In the present embodiment, the personal information can include identity information and preference information of the persons. In the present step, the personal information about participating persons can be acquired through any one of the following manners.

A first manner is: acquiring, via a router, a device list of devices currently connected into a network, determining the identity information about the participating persons based on the device list; and acquiring the preference information about the participating persons based on the identity information about the persons.

A second manner is: acquiring locations of devices which have been bound; determining the identity information about the participating persons based on the locations of the devices; and acquiring the preference information about the participating persons based on the identity information.

A third manner: analyzing relevant documents to acquire the personal information about the participating persons. Wherein, the relevant documents include one or more of: log files, chat transcripts and emails.

In step S102, an operation mode of the smart home device is determined based on the personal information, for the smart home device to perform a task according to the operation mode.

Based on the above step S101, after the personal information about the participating persons is acquired, an operation mode of the smart home device is determined based on the personal information. In the present step, when the subject device is a control device for controlling the smart home device, the operation mode is sent to the smart home device for the smart home device to perform the task according to the operation mode. When the subject device is the smart home device, the task is performed according to the operation mode.

It can be seen from the above that, in the present disclosure, personal information about the participating persons can be acquired, and then an operation mode of the smart home device can be determined based on the personal information, for the smart home device to perform a task according to the operation mode. In the present disclosure, the smart home device can perform a task according to an operation mode based on the personal information about the participating persons, to realize intelligent operation, meet the user's demand and improve user experience.

Figure 2:
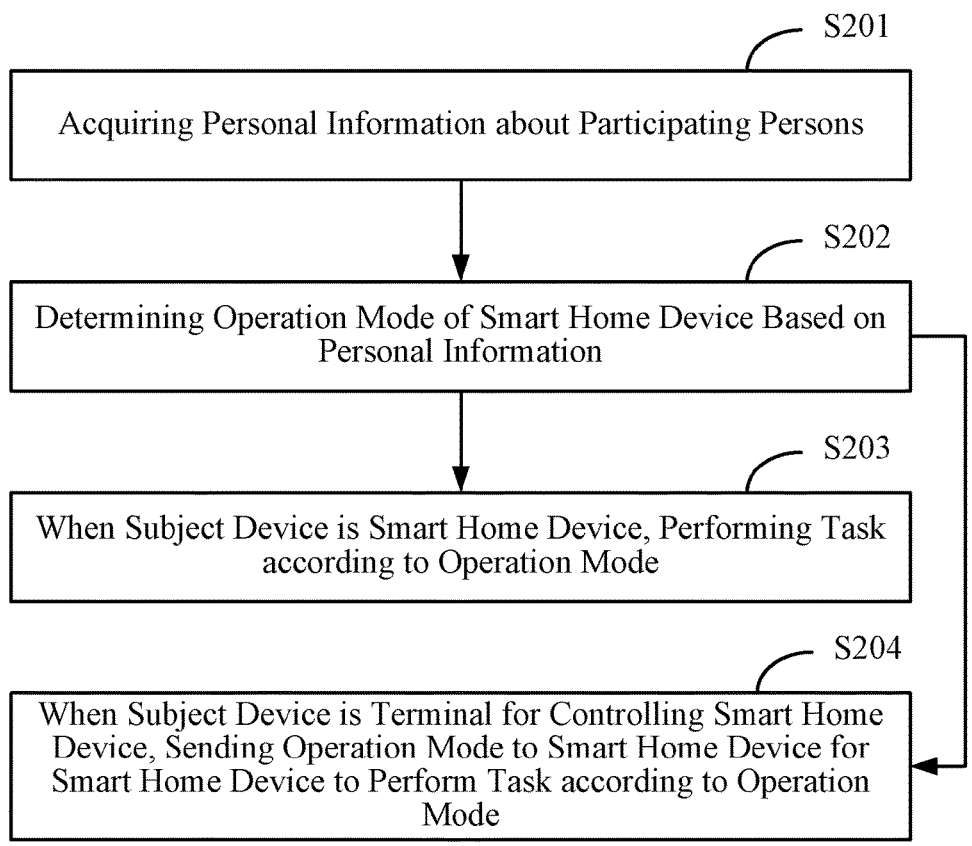
FIG. 2 is a flow chart illustrating another control method for a smart home device according to an exemplary embodiment.

FIG. 2 is a flow chart illustrating a control method for a smart home device according to an exemplary embodiment.

As shown in FIG. 2, the control method for a smart home device can be applied in a smart device which can include a smart terminal, a smart home device or the like. Wherein, when the control method for a smart home device is applied in a smart terminal, the smart terminal can control a smart home device over a network, and the smart terminal is a control device for the smart home device. When the control method for a smart home device is applied in a smart home device, the smart home device can perform a task according to various control manners provided by the embodiments of the present disclosure. In the embodiment as shown in FIG. 2, the control method for a smart home device includes the following steps.

In step S201, personal information about participating persons is acquired.

In the present embodiment, the personal information can include identity information and preference information of the persons. In the present step, the smart device can acquire personal information about participating persons when a preset time comes, or can acquire personal information about participating persons upon receiving an instruction from the user. This is not specifically limited by the present disclosure.

The personal information about participating persons can be acquired through any one of the following manners.

A first manner is: acquiring, via a router, a device list of devices currently connected into a network, determining the identity information about the participating persons based on the device list; and acquiring the preference information about the participating persons based on the identity information about the persons.

In an operation scenario of the smart home device according to the present embodiment, a smart router (briefly referred to as router in the present disclosure) which is configured to connect devices to a network is generally included. The router records therein a device list of all the devices connected to the network via the router. The device list can contain device identifications, connecting times and other information. In this manner, the smart device as a subject performing the method according to the present embodiment, can acquire from the router the device list of devices currently connected in the network, and then determine the identity information about the participating persons based on the device list. For example, the smart device can acquire from the device list a device identification of a device currently connected in the network, and then inquire about the identity information about a person who possesses the device from a cloud terminal or locally. After the identity information of the participating person is determined, the preference information about the participating person can be inquired about from the cloud terminal or locally based on the identity information.

For example, in an application scenario of a smart rice cooker, the participating persons are dining persons, the identity information about the participating persons is identity information about the dining persons, and the preference information about the participating persons is taste preference information about the dining persons. For example, in an application scenario of a home, the smart device can acquire a device list of devices currently connected in the network via a router in the home. For example, the devices currently connected in the network include a mobile phone A and a mobile phone B. The smart device can inquire about the identity information about the persons who possess these devices from the cloud terminal or locally based on the identifications of the mobile phone A and the mobile phone B. For example, if the grandmother possesses the mobile phone A, and the mother possesses the mobile phone B, it can be determined that the dining persons are the grandmother and the mother. Then, the smart device can acquire taste preference information about the grandmother and the mother from the cloud terminal. For example, both of the grandmother and the mother favor soft rice. However, in practical implementation, the cloud terminal can also send identity information corresponding to the device identifications to the router to be stored in the router. In this manner, the smart device can directly acquire from the router identity information about the dining persons who are currently connected in the network. This is not specifically limited by the present disclosure.

A second manner is: acquiring locations of devices which have been bound; determining the identity information about the participating persons based on the locations of the devices; and acquiring the preference information about the participating persons based on the identity information.

In this manner, devices of potential participating persons are bound with the smart device in advance. The smart device can acquire the locations of the devices which have bound with it, and then determine the identity information about the participating persons based on the locations of the devices. For example, the smart device can determine device identifications of the devices possessed by the participating persons based on the locations, then determine the identity information about the participating persons based on the device identifications, and in turn, acquire the preference information about the participating persons based on the identity information.

Still taking the application scenario of the smart rice cooker for example, the user can bind the devices of the potential dining persons with the smart device. For example, the grandmother possesses the mobile phone A, the mother possesses the mobile phone B and the father possesses a mobile phone C. The smart device can acquire locations of the mobile phone A, the mobile phone B and the mobile phone C. Then, based on the locations of the three mobile phones, the dining persons who will arrive at home to have meal can be determined. For example, both of the mobile phone A possessed by the grandmother and the mobile phone B possessed by the mother are located at home, and the mobile phone C possessed by the father is located in Shanghai. The smart device can determine that the identity information about the dining persons who will have meal at home in Beijing is: the grandmother and the mother. Then, the smart device can acquire from the cloud terminal taste preference information about the grandmother and the mother, which will not be repeated herein.

A third manner: analyzing relevant documents to acquire the personal information about the participating persons.

In this manner, the smart device can be provided with permission to the relevant documents such that the smart device can access the relevant documents and analyze the information recorded in the relevant documents to acquire the personal information about the participating persons. Wherein, the relevant documents include one or more of: log files, chat transcripts and emails.

Still taking the application scenario of the smart rice cooker as the smart home device for example, the smart device can analyze the log files of the users, and can determine the identity information about the dining persons from the log files, and then acquire the taste preference information about the dining persons from the cloud terminal or locally based on the identity information.

However, in the present embodiment, the manners through which the personal information about the participating persons is acquired are not limited to the above three manners. In practical application, the identity information about the participating persons can be input by the user, and the smart device can acquire the preference information about the participating persons from the cloud terminal or locally based on the identity information. This is not specifically limited by the present disclosure.

In step S202, an operation mode of the smart home device is determined based on the personal information.

Based on the above step S201, after the personal information about the participating persons is acquired, the operation mode of the smart home device can be determined based on the personal information. For example, when there is only one participating person, an operation mode matching with the preference can be determined based on the preference information about the participating person. When there are multiple participating persons, an operation mode matching with the preferences of most of the participating persons can be determined based on the preference information about most of the participating persons, or an operation mode matching with a preference of the highest priority can be determined based on the preference information about a participating person of the highest priority.

Still taking the application scenario of the smart rice cooker for example, the operation mode of the smart home device is a cooking mode of the smart rice cooker, containing information about one or more cooking parameters such as cooking temperature. It is assumed that the smart device acquires that the dining person is only the grandmother and the grandmother favors soft rice. Then in the present step, it can be determined that the cooking mode of the smart rice cooker is a soft-rice cooking mode. If the smart device acquires that the dining person is the grandmother, the mother and the father, wherein the grandmother and the mother favor soft rice and the father favors hard rice, based on the tastes of most of the persons, in the present step, it can be determined that the cooking mode of the smart rice cooker is a soft-rice cooking mode. However, in practical application, for each of the dining persons, a parameter of the cooking mode corresponding to a respective taste can be firstly determined, an average value of the parameters of the cooking mode is then calculated, and the average value of the parameters is determined as the parameter of the cooking mode in the present step. In another optional embodiment of the present disclosure, the personal information about the dining persons can also include priorities of the dining persons. If among the grandmother, the mother and the father, the grandmother has the highest priority, in the present step, the cooking mode of the smart rice cooker can be determined as a soft-rice cooking mode based on the taste preference information about the grandmother.

In step S203, when the subject device is the smart home device, the smart home device performs the task according to the operation mode.

When the subject device performing the control method for the smart home device in the present embodiment is the smart home device, after the smart home device determines the operation mode, the smart home device performs the task according to the operation mode. For example, after the smart rice cooker determines the cooking mode, the smart rice cooker cooks according to the cooking mode.

In step S204, when the subject device is a terminal for controlling the smart home device, the operation mode is sent to the smart home device for the smart home device to perform the task according to the operation mode.

When the subject device performing the control method for the smart home device in the present embodiment is a smart terminal, the smart terminal sends the operation mode to the smart home device such that the smart home device can perform a task according to the operation mode after the smart home device receives the operation mode.

It can be seen from the above that, in the present disclosure, personal information about the participating persons can be acquired, and then an operation mode of the smart home device can be determined based on the personal information, for the smart home device to perform a task according to the operation mode. In the present disclosure, the smart home device can perform a task according to an operation mode based on the personal information about the participating persons, to realize intelligent operation, meet the user's demand and improve user experience.

In another optional embodiment of the present disclosure, the smart device can also determine raw material information for the task of the smart home device based on the personal information. Still taking the application scenario of the smart rice cooker for example, the smart device can determine an amount of rice to be cooked based on the identity information about the dining persons, and can prompt the amount of rice to be cooked to the user for the user to feed a proper amount of rice for the cooking. When the subject device performing the control method for the smart home device in the present embodiment is a smart terminal, the smart terminal can send the determined amount of rice to be cooked to the smart rice cooker, the smart rice cooker can automatically feed rice via a connected rice feed inlet or a mechanical gripper and feed proper amount of water, and then perform cooking according to the cooking mode. When the subject device performing the control method for the smart home device in the present embodiment is the smart rice cooker, the smart rice cooker can automatically feed rice and water according to the amount of rice to be cooked and perform the cooking according to the cooking mode. The process will not be described in detail in the present disclosure.

In another optional embodiment of the present disclosure, the smart device can also determine a finishing time of a target task, and then calculate a task starting time based on the finishing time of the target task. Still taking the application scenario of the smart rice cooker for example, the finishing time of the target task is a finishing time of rice cooking, and the task starting time is a time for starting the rice cooking. The smart device can calculate the time for starting the rice cooking based on a dinner time. If it is assumed that the dinner time is 19:00 and a rice cooking time period of the smart rice cooker is 45 minutes, the time for starting the rice cooking is 18:15.

After the time for starting the rice cooking is determined, when the subject device performing the control method for the smart home device in the present embodiment is a smart terminal, the smart terminal can send the time for starting the rice cooking to the smart rice cooker before 18:15, for the smart rice cooker to start smart rice cooker at 18:15. When the subject device performing the control method for the smart home device in the present embodiment is the smart rice cooker, the smart rice cooker starts to cook rice at 18:15.

In the present embodiment, the smart device determines a finishing time of a target task through one of the following manners.

A first manner: the smart device determines the finishing time of the target task based on locations of the participating persons. In this manner, after the smart device acquires the personal information about the dining persons, the smart device acquires current locations of the dining persons through the bound devices possessed by the dining persons. Then, for each person, the smart device calculates a time to be consumed from his/her current location to home, and takes the latest time of a dining person going home for meal as the dinner time, i.e. the finishing time of the target task.

A second manner: the smart device determines the finishing time of the target task based on locations and preference information of the participating persons. The preference information can also include rice temperature favored by the dining persons. For example, the dining persons like to eat cooked rice after the rice is naturally cooled to around 40 degree, and it will take 30 minutes to naturally cool the rice to 40 degree after it is cooked. Then, the time for starting the rice cooking is the dinner time minus the cooking time period and minus the naturally cooling time period. If it is assumed that the dinner time is determined to be 19:00 based on the locations of the dining persons, and the time period for natural cooling is 30 minutes, the finishing time of rice cooking is 18:30 and the time for starting the rice cooking is 17:45.

Hereinafter, the specific implementation of the present disclosure will be described with reference to a specific embodiment.

Figure 3:
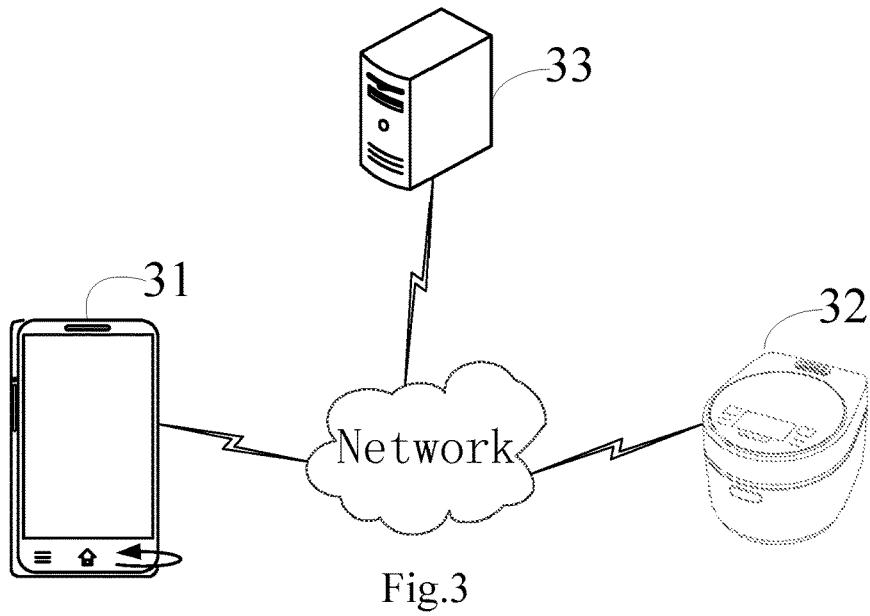
FIG. 3 is a schematic diagram illustrating an application scenario of a smart rice cooker according to an exemplary embodiment.

FIG. 3 is a schematic diagram illustrating an application scenario of a smart rice cooker according to an exemplary embodiment. As shown in FIG. 3, a smart rice cooker 32 is at home of a user, the user possesses a mobile phone 31, and the smart devices possessed by the user's family members the father, the mother and the grandmother are bound with the user's account. When the user logs in the account with the mobile phone 31 at home in Beijing, the mobile phone 31 can acquire a location of a smart device possessed by each of the family members. If, a tablet computer possessed by the grandmother is at home, a mobile phone possessed by the father is at a place 3 kilometers from the home, and a mobile phone possessed by the mother is in Shanghai, the mobile phone 31 can determine that the dining persons who will have meal at home are the father, the grandmother and the user himself. Then, the mobile phone 31 can acquire from a server 33 in a cloud terminal, tastes in rice favored by the father, the grandmother and the user himself. It is assumed that the mobile phone 31 acquires that the father and the user himself like hard rice, and the grandmother likes soft rice, and the grandmother has the highest priority among the three dining persons, the mobile phone 31 can determine that the cooking mode of the smart rice cooker is a soft-rice cooking mode. In addition, the mobile phone 31 can also acquire from the cloud terminal an amount of rice for each dining person's in a meal, for example, 100 grams of rice for each of the grandmother and the user himself, 200 grams of rice for the father, and totally 400 grams of rice for the meal. The mobile phone 31 can send the above cooking mode and the amount of rice needed to the smart rice cooker 32 via the network. The, the smart rice cooker 32 can automatically feed 400 grams of rice and proper water and start cooking according to the cooking mode.

In the application scenario as shown in FIG. 3, the mobile phone 31 can control the smart rice cooker 32 through the method according to the embodiments as shown in FIG. 1 or 2 described above, which will not be repeated herein.

Corresponding to the above embodiments regarding a control method for a smart home device, the present disclosure also provides embodiments regarding a control device for a smart home device.

Figure 4:
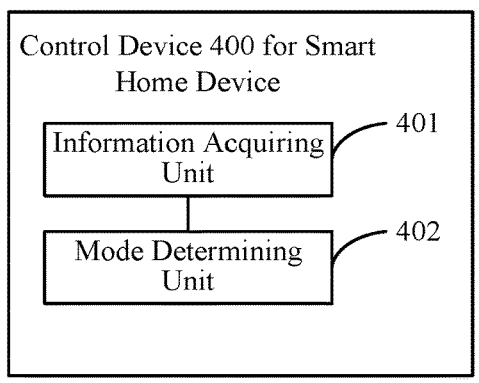
FIG. 4 is a block diagram of a control device for a smart home device according to an exemplary embodiment.

FIG. 4 is a block diagram of a control device for a smart home device according to an exemplary embodiment.

As shown in FIG. 4, the control device 400 for a smart home device, which can be applied in a smart device, including: an information acquiring unit 401 and a mode determining unit 402.

Wherein, the information acquiring unit 401 is configured to acquire personal information about participating persons; and the mode determining unit 402 is configured to determine an operation mode of the smart home device based on the personal information, for the smart home device to perform a task according to the operation mode.

In the above embodiment, the personal information about the participating persons can be acquired, and an operation mode of the smart home device can be determined based on the personal information, for the smart home device to perform a task according to the operation mode. In the present disclosure, the smart home device can perform a task according to an operation mode depending on the personal information about the participating persons. Thereby, it can achieve intelligent operation, meet the demand of the users and improve the user experience.

Figure 5:
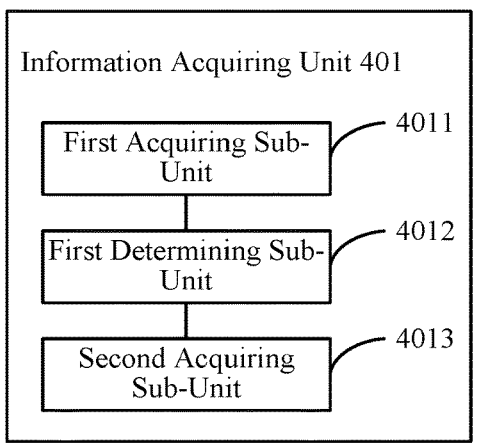
FIG. 5 is a block diagram of another control device for a smart home device according to an exemplary embodiment.

FIG. 5 is a block diagram of another control device for a smart home device according to an exemplary embodiment.

As shown in FIG. 5, the embodiment is based on the embodiment as shown in FIG. 4. The personal information contains: identity information and preference information; and the information acquiring unit 401 can include: a first acquiring sub-unit 4011, a first acquiring sub-unit 4012 and a second acquiring sub-unit 4013.

Wherein, the first acquiring sub-unit 4011 is configured to acquire, via a router, a device list of devices currently connected into a network;

the first determining sub-unit 4012 is configured to determine the identity information about the participating persons based on the device list; and the second acquiring sub-unit 4013 is configured to acquire the preference information about the participating persons based on the identity information about the persons.

Figure 6:
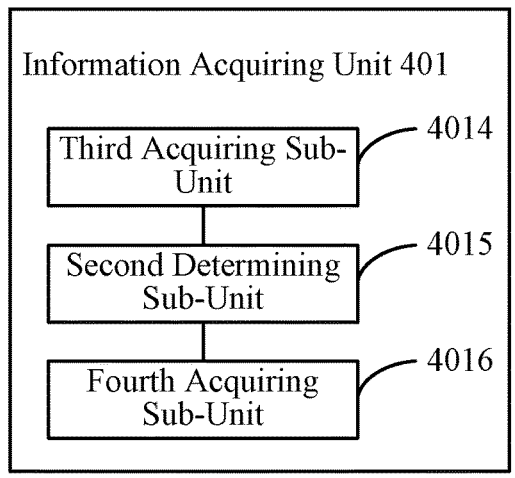
FIG. 6 is a block diagram of another control device for a smart home device according to an exemplary embodiment.

FIG. 6 is a block diagram of another control device for a smart home device according to an exemplary embodiment.

As shown in FIG. 6, the embodiment is based on the embodiment as shown in FIG. 4. The personal information contains: identity information and preference information; and the information acquiring unit 401 can include: a third acquiring sub-unit 4014, a second determining sub-unit 4015 and a fourth acquiring sub-unit 4016.

Wherein, the third acquiring sub-unit 4014 is configured to acquire locations of devices which have been bound;

the second determining sub-unit 4015 is configured to determine the identity information about the participating persons based on the locations of the devices; and the fourth acquiring sub-unit 4016 is configured to acquire the preference information about the participating persons based on the identity information.

Figure 7:
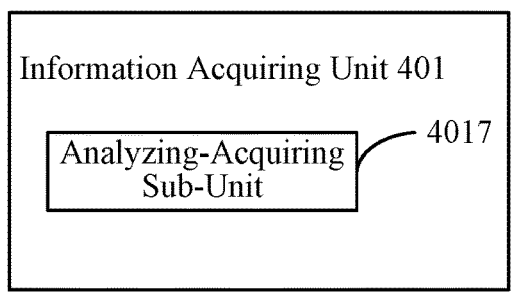
FIG. 7 is a block diagram of another control device for a smart home device according to an exemplary embodiment.

FIG. 7 is a block diagram of another control device for a smart home device according to an exemplary embodiment.

As shown in FIG. 7, the embodiment is based on the embodiment as shown in FIG. 4. The information acquiring unit 401 can include: an analyzing-acquiring sub-unit 4017.

The analyzing-acquiring sub-unit 4017 is configured to analyze relevant documents to acquire the personal information about the participating persons.

Optionally, the relevant documents include one or more of: log files, chat transcripts and emails.

Figure 8:
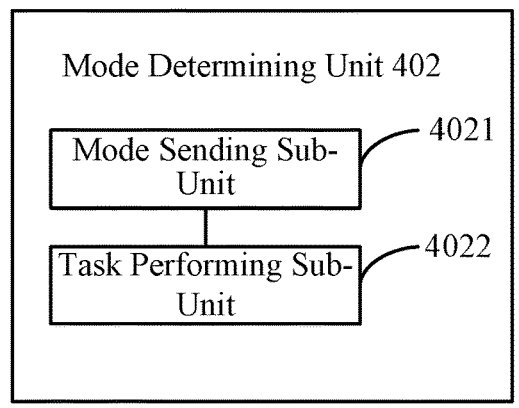
FIG. 8 is a block diagram of another control device for a smart home device according to an exemplary embodiment.

FIG. 8 is a block diagram of another control device for a smart home device according to an exemplary embodiment.

As shown in FIG. 8, the embodiment is based on the embodiment as shown in FIG. 4. The mode determining unit 402 can include: a mode sending sub-unit 4021 and a task performing sub-unit 4022.

Wherein, the mode sending sub-unit 4021 is configured to, when the control device is a control device for controlling the smart home device, send the operation mode to the smart home device for the smart home device to perform the task according to the operation mode; and the task performing sub-unit 4022 is configured to, when the control device is the smart home device, perform the task according to the operation mode.

It should be noted that, the mode sending sub-unit 4021 and the task performing sub-unit 4022 included in the embodiment as shown in FIG. 8 can also be included in the above device embodiments as shown in FIGS. 5-7. This is not specifically limited by the present disclosure.

Figure 9:
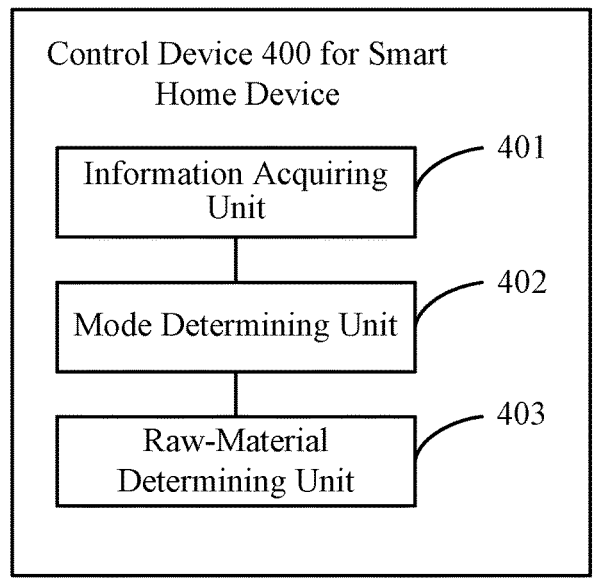
FIG. 9 is a block diagram of another control device for a smart home device according to an exemplary embodiment.

FIG. 9 is a block diagram of another control device for a smart home device according to an exemplary embodiment.

As shown in FIG. 9, the embodiment is based on the embodiment as shown in FIG. 4. The control device 400 for a smart home device can also include: a raw-material determining unit 403.

The raw-material determining unit 403 is configured to determine raw material information for the task of the smart home device based on the personal information.

Figure 10:
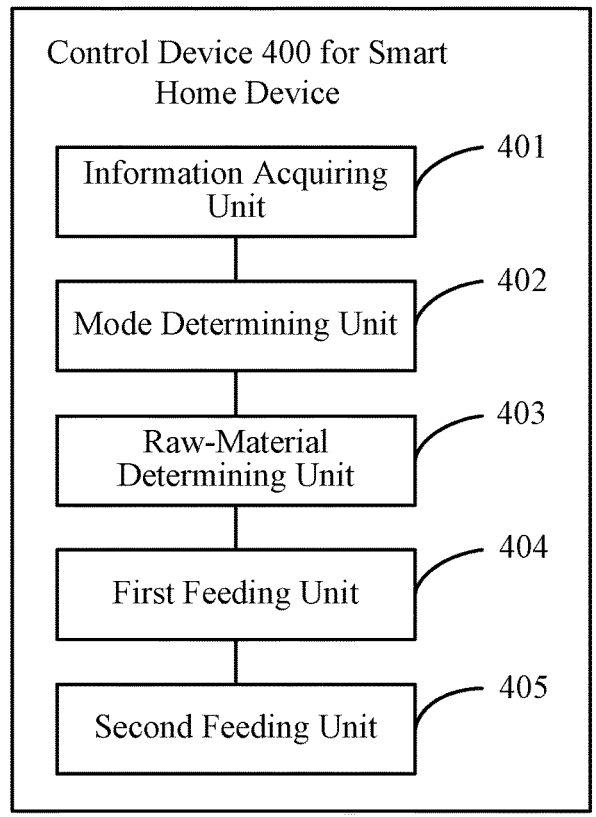
FIG. 10 is a block diagram of another control device for a smart home device according to an exemplary embodiment.

FIG. 10 is a block diagram of another control device for a smart home device according to an exemplary embodiment.

As shown in FIG. 10, the embodiment is based on the embodiment as shown in FIG. 9. The control device 400 for a smart home device can also include: a first feeding unit 404 and a second feeding unit 405.

Wherein, the first feeding unit 404 is configured to, when the control device is the smart home device, automatically feed raw material based on the raw material information and perform the task according to the operation mode; and the second feeding unit 405 is configured to, when the control device is a control device for controlling the smart home device, send the raw material information to the smart home device for the smart home device to automatically feed raw material based on the raw material information and perform the task according to the operation mode.

Figure 11:
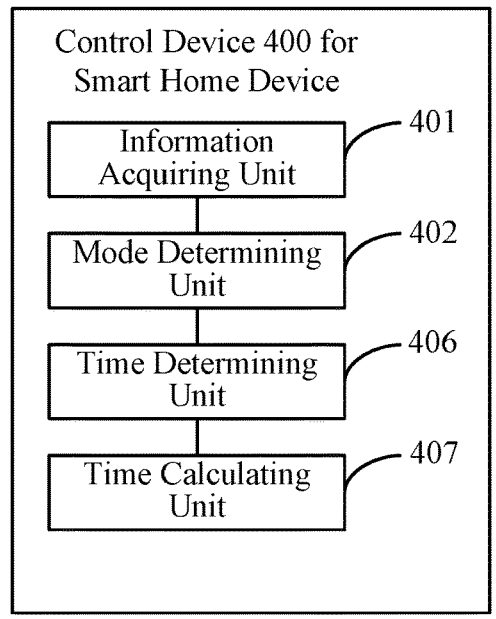
FIG. 11 is a block diagram of another control device for a smart home device according to an exemplary embodiment.

FIG. 11 is a block diagram of another control device for a smart home device according to an exemplary embodiment.

As shown in FIG. 11, the embodiment is based on the embodiment as shown in FIG. 4. The control device 400 for a smart home device can also include: a time determining unit 406 and a time calculating unit 407.

Wherein, the time determining unit 406 is configured to determine a finishing time of a target task; and the time calculating unit 407 is configured to calculate a task starting time based on the finishing time of the target task.

Figure 12:
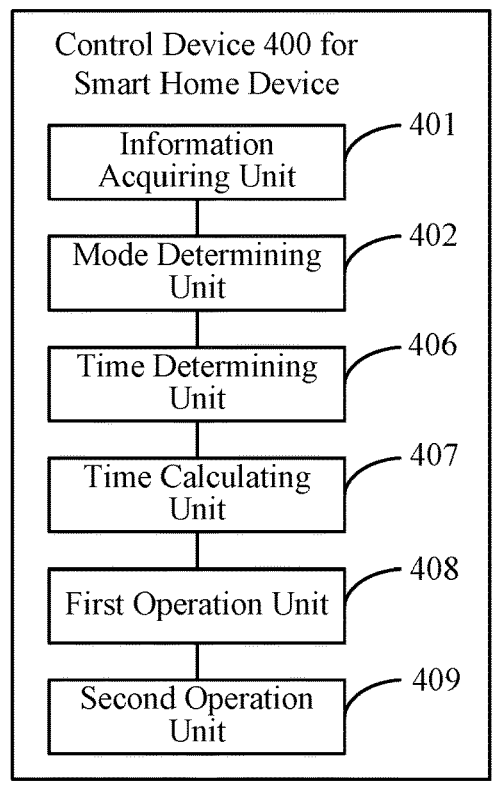
FIG. 12 is a block diagram of another control device for a smart home device according to an exemplary embodiment.

FIG. 12 is a block diagram of another control device for a smart home device according to an exemplary embodiment.

As shown in FIG. 12, the embodiment is based on the embodiment as shown in FIG. 11. The control device 400 for a smart home device can also include: a first operation unit 408 and a second operation unit 409.

Wherein, the first operation unit 408 is configured to, when the control device is the smart home device, start to perform the target task when the task starting time comes; and the second operation unit 409 is configured to, when the control device is a control device for controlling the smart home device, send the task starting time to the smart home device for the smart home device to start to perform the target task when the task starting time comes.

Figure 13:
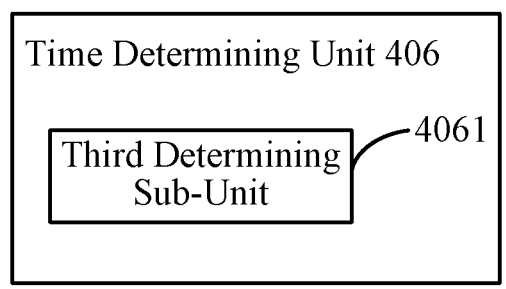
FIG. 13 is a block diagram of another control device for a smart home device according to an exemplary embodiment.

FIG. 13 is a block diagram of another control device for a smart home device according to an exemplary embodiment.

As shown in FIG. 13, the embodiment is based on the embodiment as shown in FIG. 11. The time determining unit 406 can also include: a third determining sub-unit 4061.

The third determining sub-unit 4061 is configured to determine the finishing time of the target task based on locations of the participating persons.

Figure 14:
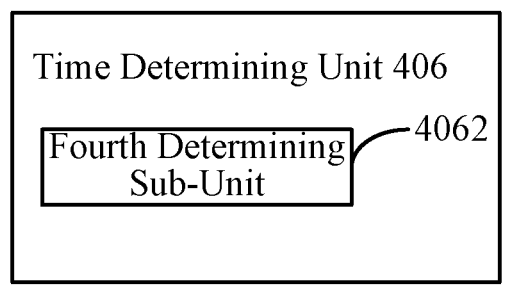
FIG. 14 is a block diagram of another control device for a smart home device according to an exemplary embodiment.

FIG. 14 is a block diagram of another control device for a smart home device according to an exemplary embodiment.

As shown in FIG. 14, the embodiment is based on the embodiment as shown in FIG. 11. The time determining unit 406 can also include: a fourth determining sub-unit 4062.

The fourth determining sub-unit 4062 is configured to determine the finishing time of the target task based on locations and preference information of the participating persons.

Optionally, the participating persons are dining persons;
the smart home device is a smart rice cooker; and
the operation mode is a cooking mode containing information about one or more cooking parameters.

Implementation of the functions and operations of the modules in the above devices can be specifically referred to the implementation of the corresponding steps in the above methods, which will not be repeated herein.

For the device embodiments, since they correspond to the method embodiments, they can be referred to the related part of the description of the method embodiments. The device embodiments described above are merely illustrative. The units described as separate may be or may not be physically separate, and the components illustrated as a units may be or may not be physical units, and may be at the same location, or may be distributed to multiple units over the network. A part of or all of the modules can be selected to achieve the objective of the present disclosure as desired. One skilled in the art can understand and practice the embodiments without paying creative labor.

Correspondingly, the present disclosure further provides a control device for smart home device, including a processor; and a memory for storing instructions executable by the processor; wherein the processor is configured to perform: acquiring personal information about participating persons; and determining an operation mode of the smart home device based on the personal information, for the smart home device to perform a task according to the operation mode.

Correspondingly, the present disclosure further provides a non-transitory computer readable storage medium, when instructions in the storage medium are executed by a processor of a smart device, the smart device is caused to perform a control method for a smart home device. The method includes: acquiring personal information about participating persons; and determining an operation mode of the smart home device based on the personal information, for the smart home device to perform a task according to the operation mode.

Figure 15:
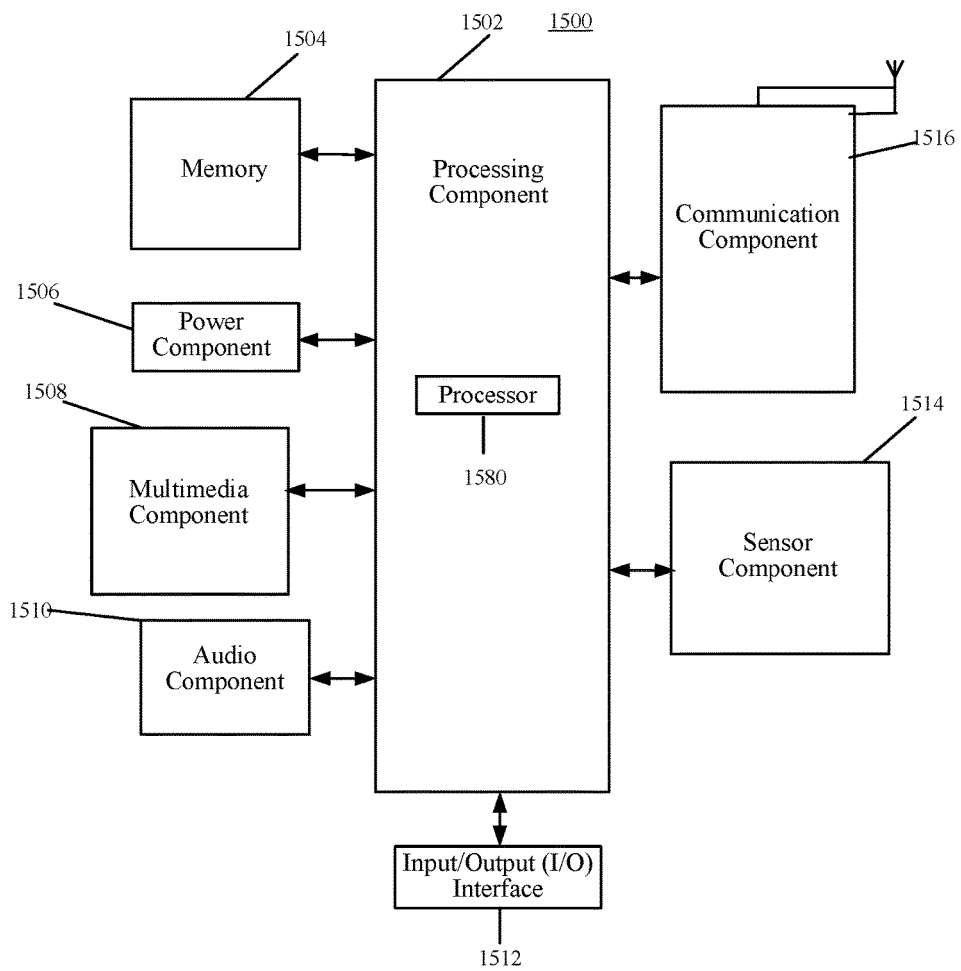
FIG. 15 is a block diagram of a control device for a smart home device according to an exemplary embodiment.

FIG. 15 is a block diagram of a control device 1500 for a smart home device according to an exemplary embodiment. For example, the device 1500 may be a mobile phone, a computer, a digital broadcast terminal, a messaging device, a gaming console, a tablet, a medical device, exercise equipment, a personal digital assistant, and the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the device 1500, such as the operations associated with display, telephone calls, data communications, camera operations, and recording operations. The processing component 1502 may include one or more processors 1580 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the device 1500. For instance, the sensor component 1514 may detect an open/closed status of the device 1500, relative positioning of components, e.g., the display and the keypad, of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the device 1500 and other devices. The device 1500 can access a wireless network based on a communication standard, such as WiFi, 2G, or 3G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1580 in the device 1500, for performing the above-described methods. For example, the non-transitory computer-readable storage medium may be a ROM, a RAM, a CD-ROM, a magnetic tape, a floppy disc, an optical data storage device, and the like.

It is noted that the various modules, sub-modules, units and components in the present disclosure can be implemented using any suitable technology. In an example, a module can be implemented using circuitry, such as integrated circuit (IC). In another example, a module can be implemented as a processing circuit executing software instructions.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling an electronic device, comprising:
    detecting a presence of a plurality of devices that each are associated with a respective one of a plurality of participating persons that are to be served a meal by the electronic device;
    acquiring, by a control device, personal information of the participating persons based on the plurality of devices, wherein the personal information includes a taste preference for the meal for each one of the participating persons; and
    determining an operation mode of the electronic device based on one or more of the taste preferences of the participating persons; and
    performing a task for serving the meal based on the operation mode.

2. The method of claim 1, wherein the personal information includes identity information and preference information, and the method comprises:
    acquiring, via a router, a list of the plurality of devices connected into a network;
    determining the identity information of the participating persons based on the list; and
    acquiring the preference information of the participating persons based on the identity information of the participating persons.

3. The method of claim 1, wherein the personal information includes identity information and preference information, and the method comprises:
    acquiring locations of devices that belong to persons who join a service program;
    determining the identity information of the participating persons based on the locations of the devices; and acquiring the preference information of the participating persons based on the identity information.

4. The method of claim 1, wherein acquiring the personal information of participating persons to be served by the electronic device comprises:
analyzing one or more of log files, chat transcripts and emails to acquire the personal information of the participating persons.

5. The method of claim 1,
wherein when the control device is separate from the electronic device, the method comprises sending the operation mode to the electronic device for causing the electronic device to perform the task according to the operation mode, and
wherein when the control device is the electronic device, the method comprises performing the task according to the operation mode.

6. The method of claim 1, further comprising:
determining material information for the electronic device to serve the participating persons based on the personal information,
wherein when the control device is the electronic device, the method comprises processing material based on the material information and performing the task according to the operation mode; and
wherein when the control device is separate from the electronic device, the method comprises sending the material information to the electronic device for the electronic device to process material based on the material information and to perform the task according to the operation mode.

7. The method of claim 1, further comprising:
determining a target finishing time of the task; and
calculating a starting time based on the target finishing time of the task.

8. The method of claim 7,
wherein when the control device is the electronic device, the method comprises starting performing the task at the starting time, and
wherein when the control device is separate from the electronic device, the method comprises sending a message including the starting time to the electronic device for the electronic device to start performing the task at the starting time.

9. The method of claim 7, wherein determining the target finishing time of the task comprises:
determining the target finishing time of the task based on locations of the participating persons.

10. The method of claim 7, wherein determining the target finishing time of the task comprises:
determining the target finishing time of the task based on locations and preference information of the participating persons.

11. A control device for controlling an electronic device, comprising:
a processor; and
a memory for storing instructions executable by the processor;
wherein the processor is configured to:
detect a presence of a plurality of devices that each are associated with a respective one of a plurality of participating persons that are to be served a meal by the electronic device;
acquire personal information of the participating persons based on the plurality of devices, wherein the personal information includes a taste preference for the meal for each one of the participating persons; and
determine an operation mode of the electronic device based on one or more of the taste preferences of the participating persons; and
performing a task for serving the meal based on the operation mode.

12. The control device of claim 11, wherein the personal information includes identity information and preference information, and the processor is further configured to:
acquire, via a router, a list of the plurality of devices connected into a network;
determine the identity information of the participating persons based on the list; and
acquire the preference information of the participating persons based on the identity information of the participating persons.

13. The control device of claim 11, wherein the personal information includes identity information and preference information, and the processor is further configured to:
acquire locations of devices that belong to persons who join a service program;
determine the identity information of the participating persons based on the locations of the devices; and
acquire the preference information of the participating persons based on the identity information.

14. The control device of claim 11, wherein the processor is configured to:
analyze one or more of log files, chat transcripts and emails to acquire the personal information of the participating persons.

15. The control device of claim 11,
wherein when the control device is separate from the electronic device, the processor is further configured to send the operation mode to the electronic device for causing the electronic device to perform the task according to the operation mode, and
wherein when the control device is the electronic device, the processor is further configured to perform the task according to the operation mode.

16. The control device of claim 11, wherein the processor is further configured to:
determine material information for the electronic device to serve the participating persons based on the personal information,
wherein when the control device is the electronic device, the processor is further configured to process material based on the material information and perform the task according to the operation mode, and
wherein when the control device is separate from the electronic device, the processor is further configured to send the material information to the electronic device for the electronic device to process material based on the material information and to perform the task according to the operation mode.

17. The control device of claim 11, wherein the processor is further configured to:
determine a target finishing time of the task; and
calculate a starting time based on the target finishing time of the task.

18. The control device of claim 17,
wherein when the control device is the electronic device, the processor is further configured to start performing the task at the starting time, and
wherein when the control device is separate from the electronic device, the processor is further configured to send a message including the starting time to the electronic device for the electronic device to start performing the task at the starting time.

19. The control device of claim 17, wherein the processor is configured to: determine the target finishing time of the task based on locations of the participating persons.

20. The control device of claim 17, wherein the processor is configured to: determine the target finishing time of the task based on locations and preference information of the participating persons.

* * * * *